(12) United States Patent
Abe et al.

(10) Patent No.: US 7,172,724 B2
(45) Date of Patent: Feb. 6, 2007

(54) METHOD OF MAKING SINTERED OBJECT

(75) Inventors: Satoshi Abe, Moriguchi (JP);
Yoshikazu Higashi, Moriyama (JP);
Hirohiko Togeyama, Tondabayashi (JP); Norio Yoshida, Kitakatsuragi (JP); Isao Fuwa, Osaka (JP); Shushi Uenaga, Moriguchi (JP); Seizo Machida, Osaka (JP); Masataka Takenami, Moriguchi (JP)

(73) Assignee: Matsushita Electric Works, Ltd., Osaka (JP)

( * ) Notice: Subject to any disclaimer, the term of this patent is extended or adjusted under 35 U.S.C. 154(b) by 235 days.

(21) Appl. No.: 10/304,963

(22) Filed: Nov. 27, 2002

(65) Prior Publication Data
US 2003/0185697 A1  Oct. 2, 2003

(30) Foreign Application Priority Data
Mar. 26, 2002 (JP) ............................. 2002-086310
Apr. 23, 2002 (JP) ............................. 2002-121410

(51) Int. Cl.
*B22F 3/10* (2006.01)
(52) U.S. Cl. .......................................... 419/6; 264/497
(58) Field of Classification Search .................... 419/7, 419/6; 264/497
See application file for complete search history.

(56) References Cited

U.S. PATENT DOCUMENTS

| 5,207,371 A | * | 5/1993 | Prinz et al. | 228/125 |
| 5,286,573 A | * | 2/1994 | Prinz et al. | 264/308 |
| 5,301,415 A | * | 4/1994 | Prinz et al. | 29/458 |
| 6,657,155 B2 | | 12/2003 | Abe et al. | |
| 6,682,688 B1 | * | 1/2004 | Higashi et al. | 264/497 |
| 2003/0062655 A1 | | 4/2003 | Lohner et al | |
| 2004/0155384 A1 | | 8/2004 | Sievers et al. | |

FOREIGN PATENT DOCUMENTS

| DE | 1 9 533960 | 3/1997 |
| DE | 1 0 065960 | 12/2001 |
| EP | 0 790875 | 11/2000 |
| JP | 8-281809 | 10/1996 |
| JP | 2000-073108 | 3/2000 |
| JP | 200073108 | 3/2000 |
| JP | 2002-115004 | 4/2002 |

OTHER PUBLICATIONS

English Language Abstract for JP Appln. No. 2000-73108.
English language Abstract of JP 2002-115004.
English language Abstract of JP 8-281809.
English Language Abstract of DE 10065960.
English Language Abstract of DE 19533960.

* cited by examiner

*Primary Examiner*—Ngoclan T. Mai
(74) *Attorney, Agent, or Firm*—Greenblum & Bernstein, P.L.C.

(57) ABSTRACT

In order for a surface of a three-dimensional sintered object to be smoothly finished by removing unwanted portions and an excessively sintered growth formed during sintering to form sintered layers, the three-dimensional sintered object is formed by repeating successive processes of dispensing a powdery material and directing an optical sintering beam to the powdery material to form the sintered layer, until a required number of integral laminated bodies are formed. During the formation of the integral laminated bodies, trimming is applied to a first zone different from a second zone in which each laminated body is formed, to remove unwanted portions of the respective laminated body.

9 Claims, 19 Drawing Sheets

DATA OF SINTERING PATH        DATA OF REMOVING PATH

TOP PLAN VIEW

METHOD OF MAKING SINTERED OBJECT

BACKGROUND OF THE INVENTION

1. Field of the Invention

The present invention relates to a method of forming a sintered object of a predetermined shape by stacking a plurality of sintered layers (hardened layers) each formed by irradiating a layer of inorganic or organic powdery material with an optical sintering beam.

2. Description of the Related Art

This sort of the sintered object forming method is disclosed in, for example, Japanese Laid-open Patent Publication No. 2000-73108. According to this publication, the three-dimensional sintered object is formed by depositing a layer of powdery metallic material on a predetermined site, directing an optical sintering beam to the layer of the powdery metallic material to form a sintered layer, forming another one or more sintered layers on the underlying sintered layer by repeating the depositing step and the beam directing step a number of times equal to the number of the sintered layers desired to be formed. The resultant sintered layers are mechanically interlocked with each other.

In this known method, a laminated body M of a size larger by a predetermined quantity than the eventually formed sintered object, each consisting of a predetermined number of the sintered layers, is formed as shown in FIG. 20A, followed by trimming the resultant laminated body M with the use of a machining tool 3 such as a ball end mill to remove an unwanted surface area or any other unwanted portion from around the laminated body M as shown in FIG. 20B. Thus, each time the laminated body is formed, the trimming is effected to remove the unwanted surface area or any other unwanted portion from around such laminated body.

Since when upon completion of the trimming process a new laminated body is to be formed above the underlying laminated body M, irradiation with the optical sintering beam L is effected so that the subsequently formed laminated body can have a size larger by a predetermined quantity than the underlying laminated body M, an excessively sintered growth M1 tends to be formed as a result of application of laser energy to form a sintered layer, which forms the lowermost one of a plurality of sintered layers of a laminated body, immediately above the uppermost one of a plurality of sintered layers of the underlying laminated body as shown in FIG. 21C. This excessively sintered growth M1 generally represents a shape similar to the shape of icicles and results from an excessive portion of the powdery metallic material having been sintered.

However, it has been found that since in the prior art method a zone A to be removed and a zone B in which each laminated body is formed, that is, a zone of the laminated body are set to exactly align with each other, that is, to lie in the same zone, a trimming path designed to encompass such zone A to be removed will not reach down to the site where the excessively sintered growth M has been formed. Accordingly, as shown in FIG. 20D, the excessively sintered growth M1 tends to be left unremoved, making it difficult to finish the three-dimensional sintered object having a smooth surface.

Also, since as shown in FIGS. 21A and 21B, the trimming step is carried out to the laminated body N after the layers of the powdery material have been sintered successively to complete the laminated body N and the trimming step is similarly carried out to the laminated body N+1 after the layers of the powdery material have been sintered successively to complete the laminated body N+1 above the laminated body N, one or some of the sintered layers of the laminated body N immediately below the laminated body N+1 are already trimmed at the time the lowermost sintered layer of the laminated body N+1 has been formed as shown in FIG. 21C. Accordingly, when the laminated body N+1 is formed, the necessity arises to create a CAD (computer aided design) data for implementing sintering of the powdery material at a portion B of the laminated body N removed by trimming. In addition, considering that a partially or incompletely sintered layer is left during sintering of the sintered layer M1 at a location immediately below the sintered layer M1 of the laminated body N+1 and this laminated body N+1 lies outside the zone to be trimmed, the sintered layer M1 remains on the eventually formed object even after completion of formation of the laminated body N+1.

In FIGS. 21A to 21C, reference character H represents the thickness of each sintered layer, reference character Hz represents an area to be removed by trimming, reference character A represents a zone to be trimmed of the laminated body N, reference character S represents a contour of the sintered layer to be formed, and reference character Sf represents a contour of a final cross-sectional shape of the eventually formed object.

FIG. 22 illustrates conceptually a relation in dimension between the contour S of the sintered layer and the final contour Sf of the cross-sectional shape of the eventually formed sintered object 1.

SUMMARY OF THE INVENTION

The present invention has been developed to substantially eliminate the various problems inherent in the prior art methods and is intended to provide a method of making a three-dimensional sintered object wherein the excessively sintered growth developed during formation of the laminated body above the previously formed laminated body can be assuredly removed to render the eventually formed object to have a smooth surface.

Another object of the present invention is to provide the method of efficiently making the three-dimensional sintered object, wherein no sintering of the powdery material at an area where the trimming has been finished is required and time-consuming and complicated procedures to create the CAD data anew are substantially alleviated.

In order to accomplish these objects, the present invention provides a method of making a three-dimensional object, which includes forming a first integral laminated body including sintered layers of powdery material that are interlocked with each other one above the other. Each of the sintered layers referred to above is formed by successive processes of dispensing a quantity of the powdery material over a target surface, and directing an optical sintering beam to the dispensed powdery material so as to scan at least a portion of the dispensed powdery material to thereby form the respective sintered layer. Thereafter, the successive processes are cyclically repeated until a predetermined number of the integral laminated bodies are formed. After the formation of the laminated bodies, trimming is applied to a first zone different from a second zone in which each laminated body is formed, to remove unwanted portions of the respective laminated body.

According to the present invention, since the area to be removed of the laminated body remains unremoved when the zone to be removed by trimming that lies below the zone of the laminated block is trimmed, subsequent deposition of the powdery material to form the next succeeding laminated body can be carried out.

If, during the step of trimming, the first zone is defined to encompass an excessively sintered growth developed as a result of formation of the laminated body, the machining tool can reach to a position where the excessively sintered growth resides, even though the excessively sintered growth formed as a result of formation of the sintered layer solidifies at a location outside the laminated body, for example, around a wall surface of the underlying laminated body which has already been trimmed. Accordingly, the excessively sintered growth can be effectively removed and, therefore, the eventually formed object can have a smooth surface, making it possible to provide the three-dimensional sintered object of a high quality.

Also, if the trimming step is performed to remove the unwanted surface portion while leaving an upper portion of the laminated body untrimmed, the upper portion of the laminated body that has been previously formed is left untrimmed at the time of formation of the next succeeding laminated body and, accordingly, the excessively sintered growth would hardly be developed at the wall surface of the laminated body which has already been trimmed. Accordingly, a load which may be imposed on the machining tool can be lessened.

Yet, if the trimming step is initiated from below the laminated body and further below at least a margin of the laminated body that is to be trimmed, subsequent sintering of the powdery material can be carried out since the overlying laminated body after the trimming still has an area to be removed.

In a preferred embodiment, the trimming step may be performed to one of the laminated bodies that is positioned below the next succeeding laminated body. According to this technique, since even when one or more of the laminated bodies positioned below the predetermined laminated body have been trimmed to remove the unwanted portion, the predetermined laminated body still has the area to be removed, subsequent deposition and sintering of the powdery material above the predetermined laminated body can be carried out.

If when a beam travel path and a trimming path are to be created from a three-dimensional profile data of the object to be formed, data on the trimming path are split at a position different from that of the beam travel path, and the excessively sintered growth can be removed assuredly.

In addition, if the data on the trimming path are split so as to expand downwardly to encompass an excessively sintered growth than the data on the beam travel path, the excessively sintered growth can be assuredly removed during the trimming step.

The present invention also provides a method of making a three-dimensional object, which includes forming a first integral laminated body including a plurality of sintered layers of powdery material that are interlocked with each other one above the other. Each of said sintered layers is formed by successive processes of dispensing a quantity of the powdery material over a target surface, and directing an optical sintering beam to the dispensed powdery material so as to scan at least a portion of the dispensed powdery material to thereby form the respective sintered layer. These successive processes are cyclically repeated until a predetermined number of the integral laminated bodies are formed. Each time the single laminated body is formed, an unwanted surface portion is trimmed from around the respective laminated body. This trimming is performed such that while that unwanted surface portion to be removed is divided into a plurality of zones to be removed, and a zone of a surface area of a shape of an expected laminated body that is subsequently formed above a predetermined one of the zones to be removed is defined as a zone to be left untrimmed, the trimming step being effected only to the zone to be trimmed excluding the zone to be left untrimmed.

If a lower layer of the surface area of the shape of the expected laminated body that is to be formed above the zone to be removed when the predetermined zone to be removed is trimmed is left untrimmed as the zone to be left untrimmed, the lower layer (the zone to be left untrimmed) left untrimmed when the laminated body is to be formed can be formed above the overlying laminated body. Accordingly, there is no need to dispense and sinter the powder material at a portion where the trimming has already been made such as practiced in the prior art and, therefore, there is no need to create anew the CAD data for carrying out the subsequent dispensing and sintering of the powdery material. Also, it is possible to avoid the trimming being effected to a zone where the sintering step has not yet been completed and, therefore, the surface finishing can be assuredly carried out.

Also, if in the predetermined zone to be removed, a portion of the laminated body immediately thereabove and not encompassed within a pattern of irradiation by the optical sintering beam is determined as a zone to be removed, it is possible to determine the zone to be trimmed based on the pattern of irradiation. It is also possible to prevent the machining tool to enter the zone to be trimmed when the trimming pulses are created.

In addition, in the split zones to be removed, a decision may be made to determine if a portion of the zone to be first removed that is determined as an area to be left untrimmed can be trimmed during trimming of the zone to be removed that is subsequently removed and, only if it is determined that it can be removed, the zone left untrimmed is added to the zone to be removed during the subsequent trimming. In this case, it is possible to form the subsequently formed laminated body above the zone to be left unremoved and then by removing the preceding zone to be left untrimmed, which was determined unnecessary when the next succeeding zone to be trimmed, it is possible to avoid the possibility that the zone to be left untrimmed which has been determined unnecessary may be left untrimmed.

Also, comparison may be made between a contour of the laminated body immediately above a predetermined trimming zone and cross-sectional contour of an expected laminated body to be subsequently formed, which is at the same height as the contour of the laminated body, so that an area outside a region encompassed within the contour of the laminated body can be determined as the region to be trimmed. In the comparison is carried out, it is possible to determine the zone to be trimmed within the predetermined area to be trimmed. It is also possible to prevent the machining tool to enter the zone to be trimmed when the trimming pulses are created.

Preferably, the zone to be removed may be set to be larger than the zone of the laminated body, so that an uppermost limit of the zone to be removed lies above an uppermost limit of the zone of the laminated body and a lowermost limit of the zone to be removed lies below a lowermost limit of the zone of the laminated body. By so doing, since when the trimming is carried out from above the laminated body, the machining tool will run idle in the absence of the laminated body at the outset, but will progressively start cutting from the start of trimming, no abrupt grinding resistance will act on the machine tool at the beginning of the trimming, thereby avoiding any damage to the machine tool and ensuring an effective removal of the excessively sintered growth.

BRIEF DESCRIPTION OF THE DRAWINGS

The present invention will become readily understood from the following description of preferred embodiments thereof made with reference to the accompanying drawings, through which like parts are designated by like reference numerals, and wherein:

FIGS. 1A to 1D illustrates a method of making a sintered object according to a first preferred embodiment of the present invention, in which FIG. 1A is an explanatory diagram when the lowermost sintered layer is formed, FIG. 1B is an explanatory diagram when the lowermost sintered layer is trimmed, FIG. 1C is an explanatory diagram when the next succeeding laminated body is formed, and FIG. 1D is an explanatory diagram when the overlying laminate body is trimmed;

DESCRIPTION OF THE EMBODIMENTS

This application is based on application Nos. 2002-86310 and 2002-121410 filed Mar. 26, 2002 and Apr. 23, 2002 respectively in Japan, the content of which is herein expressly incorporated by reference in its entirety.

Various preferred embodiments of the present invention will now be described with reference to the accompanying drawings.

First Embodiment (FIGS. 1 to 14)

FIGS. 1A to 1D illustrate a conception of a process of removing, with a machining tool 3, an excessively sintered growth M1 formed as a result of application of laser energy to form a sintered layer, which forms the lowermost one of a plurality of sintered layers of a laminated body Mb, immediately above the uppermost one of a plurality of sintered layers of the underlying laminated body Ma. As is well known to those skilled in the art, an integral three-dimensional object can be obtained by forming a desired or required number of individually contoured sintered layers of the same or gradually varying shape on a support base. However, the physical limitation inherent in and/or imposed on the machining tool 3 does not allow unwanted portions to be removed from around the entire number of the sintered layers all at a time and, accordingly, removal of those unwanted portions of the sintered layers is generally practiced for each of the laminated bodies each consisting a predetermined number of, for example, 60 sintered layers. So far shown in FIGS. 1A and 1B, for facilitating a better understanding of the present invention, the three-dimensional object desired to be produced is assumed to be a solid cylinder made up of two laminated bodies Ma and Mb each consisting of, for example, 60 sintered layers.

Figure 2:
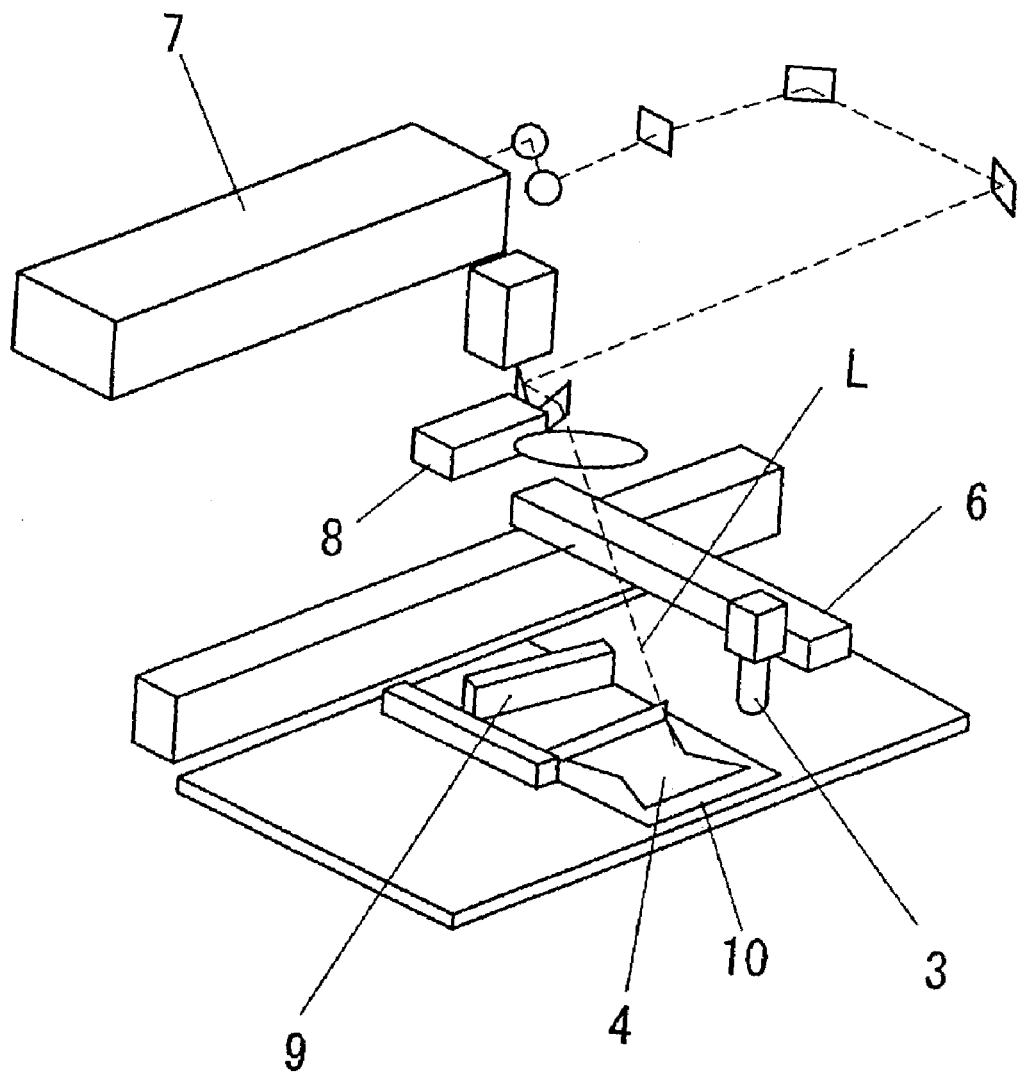
FIG. 2 is a perspective view of an object forming machine pertaining to the present invention.
Figure 3:
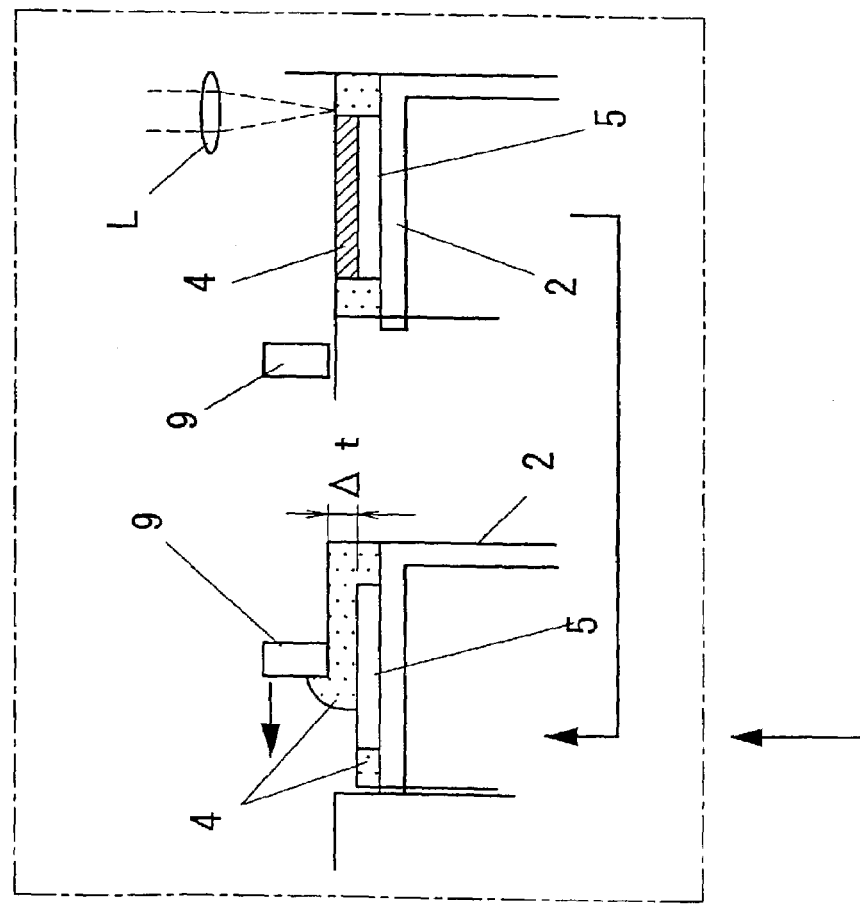
FIGS. 3A to 3C are explanatory diagrams showing a process ranging from supply of a powdery material to high speed machining in the object making method of according to the first embodiment of the present invention, respectively.

FIG. 2 schematically illustrates an object forming apparatus including a trimming mechanism 6 including the machining tool 3 such as, for example, a ball end mill, an optical beam projector 7, a beam deflector 8, and a leveling blade 9 for leveling a top surface of a layer of organic or inorganic powdery material dispensed over a target surface which may be a support base or one or more sintered layers deposited on the support base. The object forming apparatus so far shown in FIG. 2 may be of any known construction and, briefly speaking, operates to perform sequential processes of supplying a quantity of the powdery material over the support base 5 mounted atop an elevating table 2 to form a powdery layer 4 that is subsequently leveled by the leveling blade 9 (FIG. 3A); irradiating, with a sintering beam L such as a laser beam, the leveled layer of the powdery material so as to scan and sinter at least a portion of the leveled layer of the powdery material substantially in a raster scan fashion to thereby form a sintered layer of a cross-sectional configuration generally matching with that of a corresponding portion of an eventually formed object (FIG. 3B); and, after a cycle of the dispensing and irradiating processes have been performed a number of times, corresponding to the number of the sintered layers in one laminated body, to form the respective sintered layers to thereby form the single laminated body M with the adjoining sintered layers having been interlocked with each other, removing unwanted portions of the sintered layers from around the entire number to thereby render the respective sintered layers to have a cross-sectional configuration substantially matching with the corresponding cross-sectional configurations of the object (FIG. 3C). Where the laminated body is desired to be formed in a plural number, that is, where the object desired or required to be formed is made up of a plurality of the laminated bodies, a cycle of these successive processes discussed above may be repeated a number of times corresponding to the number of the laminated bodies so desired or required.

Figure 4:
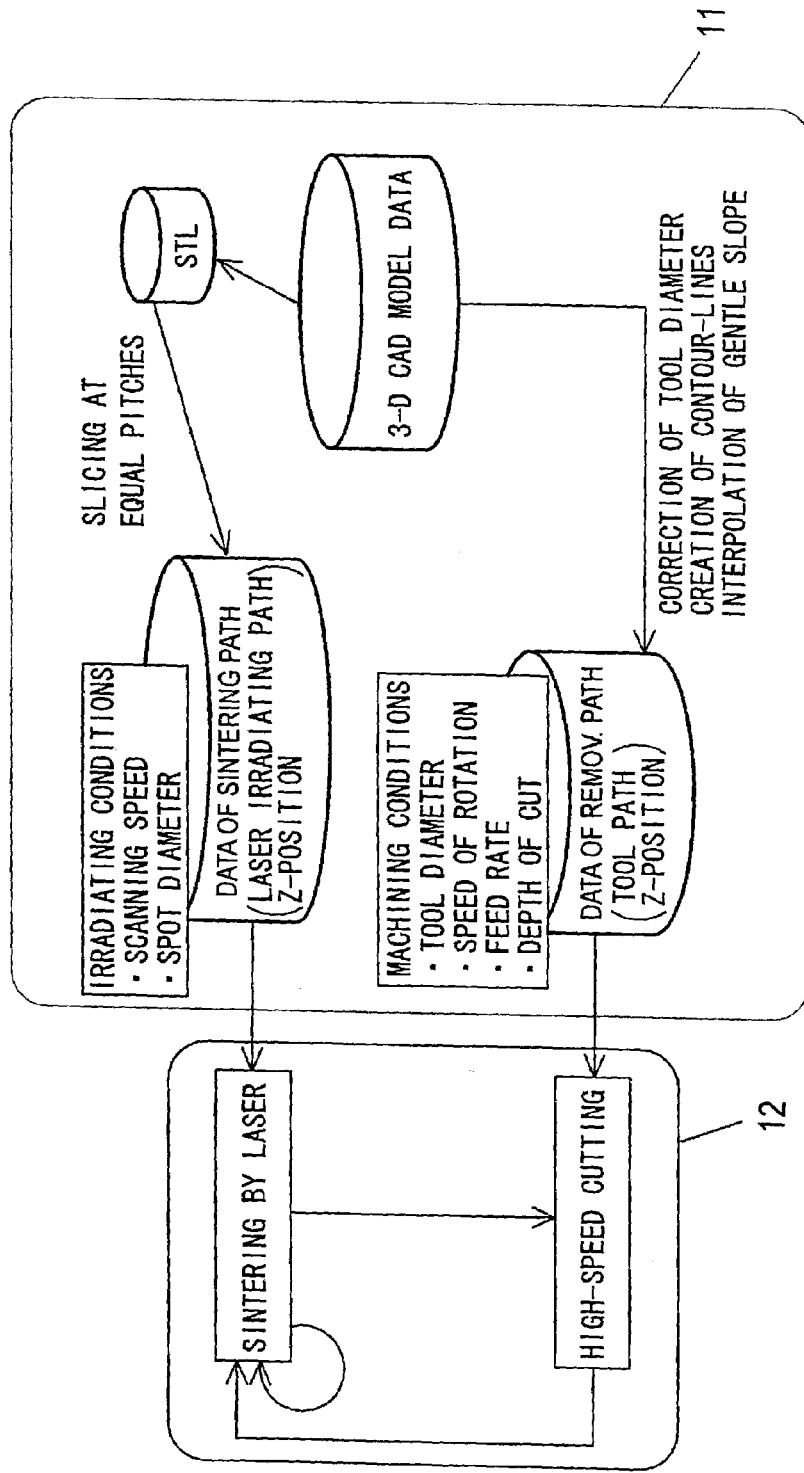
FIG. 4 is an explanatory diagram showing a process ranging from data generation to trimming through sintering in the object making method according to the first embodiment of the present invention.

FIG. 4 illustrates an object forming system made up of a CAD (computer aided design) data generating unit 11 and an object forming station 12 linked with the CAD data generating unit 11.

Referring now to FIGS. 3A to 3C, and particularly to FIGS. 2 and 3A, a quantity of organic or inorganic powdery material 4 is dispensed over the base 5 resting atop the elevating table 2, which is then leveled by a traversal of the leveling blade 9 to render the powdery layer 4 to have a predetermined thickness Δt. Subsequently, as shown in FIG. 3B the optical beam L from the optical beam projector 7 is directed towards the powdery layer 4 through the beam deflector 8 so as to impinge upon at least that portion of the leveled powdery layer 4 which, when the directed optical beam L scan the powdery layer 4 substantially in a raster scan fashion, form a sintered layer of a cross-sectional configuration generally matching with that of a corresponding portion of an eventually formed object. This cycle of dispensing the powdery material, leveling the dispensed powdery material and sintering the leveled powdery material to form a single sintered layer is repeated a number of times corresponding to the number of the sintered layers desired or required to form a single laminated body M. The elevating table 2 with the base 5 mounted thereon is lowered stepwise each time a single sintered layer is formed to allow the underlying sintered layer to accommodate another quantity of the powdery material that is dispensed to eventually form the next succeeding sintered layer. FIG. 3C illustrates the condition in which the above discussed cycles has been performed eight times to form a stack of eight laminated bodies M firmly fusion bonded together.

It is, however, to be noted that considering that because a single sintered layer may have a fairly small thickness, say, about 0.05 mm, the object desired to be formed may require a stack of a plurality of laminated bodies 4. For example, if the object desired to be formed has a height of about 10 cm, the number of the sintered layers to be formed would amount to about 2000 which would define about 34 laminated bodies M if each laminated body M consists of about 60 sintered layers.

FIG. 3C also illustrates the condition in which, in order to complete the object of a configuration made up of a cylindrical wall and a bottom wall with a protrusion formed on an inner surface of the bottom wall, the object resting on the base 5 is subjected to the trimming process. This trimming process is performed to remove not only the unwanted portions of the sintered layers from around the entire number, but also the excessively sintered growth M1 formed as a result of application of laser energy to form a sintered layer, which forms the lowermost one of a plurality of sintered layers of the laminated body Mb, immediately above the uppermost one of a plurality of sintered layers of the underlying laminated body Ma as discussed with reference to FIG. 1C. In accordance with the present invention, this trimming process is performed in a manner as will be described in detail later, each time a single laminated body M is formed to remove not only the unwanted portions of the laminated body M from therearound, but a relatively fragile outer surface area of each laminated body M that contains a low density of particles of the powdery material.

In the practice of the present invention, the powdery material that can be employed may be a mass of globular iron particles having an average particle size of about 20 μm, with each sintered layer being about 0.05 mm in thickness, and the optical sintering beam L may be a $CO_2$ laser. The leveling blade 9 is supported for movement in a plane parallel to the target surface that is scanned by the optical sintering beam L. If the machining tool 3 in the form of a ball end mill of 1 mm in diameter and having an effective blade length of 5 mm is used to trim a depth of 3 mm during the trimming process, a single pass of trimming would be sufficient to remove unwanted portions from around the laminated body M consisting of 60 sintered layers (i.e.,= (Machining Depth)/(Thickness of Each Sintered Layer)). The machining tool 3 is drivingly associated with an X-Y table such that the machining tool 3 can be relatively moved horizontally when the X-Y table is moved in a plane defined by a Cartesian coordinate system and can also be moved relatively vertically, i.e., in a Z-axis direction when the elevating table 2 is moved vertically in a direction perpendicular to the plane in which it moves horizontally.

It is to be noted that other than grinding by the use of the ball end mill referred to above, the trimming process may be performed by grinding with the use of a flat end mill, polishing or blasting. Also, the trimming process may be accomplished thermally—for example, heating by irradiation of a laser beam or by the use of any other chemical technique such as a chemical polishing.

The path of travel of the optical sintering beam L and the trace of travel of the machining tool 3 are programmed in the form of a 3D CAD data with a suitable 3D CAD software in the CAD data generating unit 11. Specifically, the path of travel of the optical sintering beam L utilizes a contour data descriptive of a cross-sectional configuration of slices obtained by cutting a 3D CAD model, represented by the 3D CAD data, at the pitch of for example, 0.05 mm. On the other hand, the object forming unit 12 adopts a contour machining technique and generates data on the path of travel of the sintering laser and trimming path data using the same 3D CAD model discussed above. It is to be noted that the pitch in the vertical direction, that is, the Z-axis direction of the contour machining path may not be always limited to the direction in which the sintered layers are laminated and that where a gentle slope exists, interpolation may be effected that the pitch in the Z-axis direction may be so small as to enable the entire surface of the eventually obtained object to be ground.

Figure 1A:
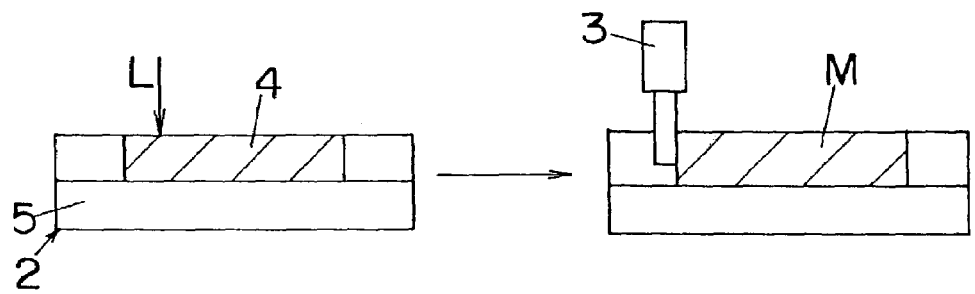
Figure 1B:
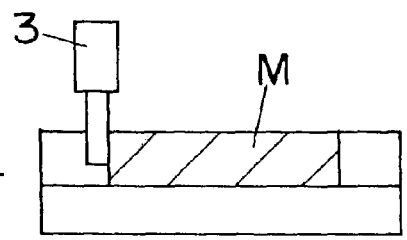

Hereinafter, the sintering process and the trimming process will be discussed. As discussed above, the optical sintering beam L is directed towards a layer of powdery material 4 dispensed over the support base 5, which may form a part of the eventually formed object, so as to irradiate at least that portion of the layer of the powdery material to form a sintered layer as shown in FIG. 1A. This sintering is repeatedly performed until a single laminated block Ma consisting of a predetermined number of, for example, 60 sintered layers is formed as shown in FIG. 1B. Referring still to FIG. 1B, after the formation of the single laminated body M, an outer peripheral surface area of the laminated body Ma and unwanted portions thereof are removed by the machining tool 3 to thereby complete the first laminated body Ma. This formation of the single laminated body Ma may be similar to that practiced by the known object forming method.

Figure 1C:
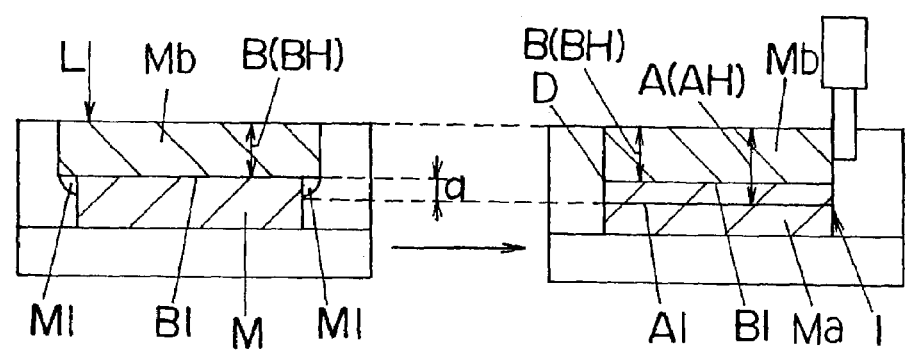

Then, as shown in FIG. 1C, an overlaying laminated body Mb similar in structure to the underlying laminated body Ma is formed on the underlying laminated body Ma by repeating the process used to form the underlying laminated body Ma with reference to FIGS. 1A and 1B. However, in accordance with the present invention, a process different from that used for trimming the outer peripheral surface area of the first laminated body Ma is employed for trimming an outer peripheral surface area of the second laminated body Mb. Specifically, when the overlaying laminated body Mb is to be trimmed to remove the outer peripheral surface area thereof, a trimming zone A in which the machining tool 3 works on the outer peripheral surface area of the overlaying laminated body Mb is so defined as to encompass the size of the growth M1 protruding downwardly beyond a sintered zone B corresponding to the thickness of the overlaying laminated body Mb. As discussed hereinbefore, the growth M1 is formed as a result of application of laser energy to form a sintered layer, which forms the lowermost sintered layer of the overlaying laminated body Mb, immediately above the uppermost sintered layer of the underlying laminated body Ma. Specifically, the trimming path data U is created in anticipation of formation of the growth M1 formed from an excessive powdery material sintered around the underlying laminated body Ma which has already been trimmed so that the machining tool 3 can start trimming in the trimming zone A so defined to remove not only the outer peripheral surface area of the overlaying laminated body Mb, but also the growth M1.

Figure 1D:
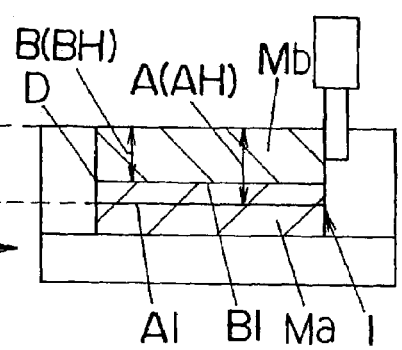

With the trimming zone A so defined as discussed above, the machining tool 3 can be set in position to start trimming not only the outer peripheral surface area of the overlaying laminated body Mb, but also the growth M1 as shown in FIG. 1D. Accordingly, the growth M1 resulting from sintering of the excessive powdery material which is, according to the prior art, left unremoved, but is machined after completion of the object, can be removed and, therefore, the object 1 so formed with the method of the present invention can have a smooth surface enough to alleviate the use of a post machining process that is otherwise necessary after the object has been completely formed. Thus, with the method of the present invention, it is possible to obtain a high quality object As discussed above, in the embodiment shown in FIGS. 1A to 1D, the height AH of the trimming zone A is chosen to be greater than the height BH of the sintered zone B, i.e., the thickness of the overlaying laminated body Mb with the lowermost limit A1 of the trimming zone A set to a position downwardly of the lowermost limit B1 of the sintered zone B, that is, a level flush with a bottom surface of the overlaying laminated body Mb, so that the excessively sintered growth M1 can be encompassed within a margin between the lowermost limits A1 and B1 of the trimming and sintered zones A and B, to thereby ensure that the excessively sintered growth M1 can be removed during the trimming process.

Figure 5A:
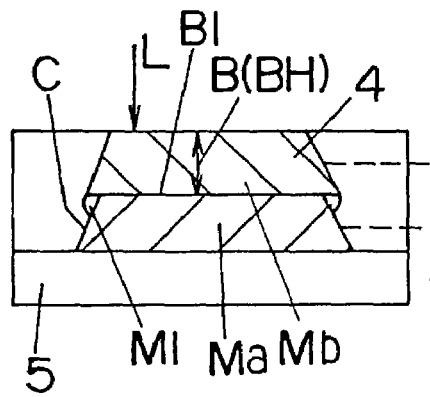
FIGS. 5A and 5B are explanatory diagrams showing a modification of the first embodiment of the present invention.
Figure 5B:
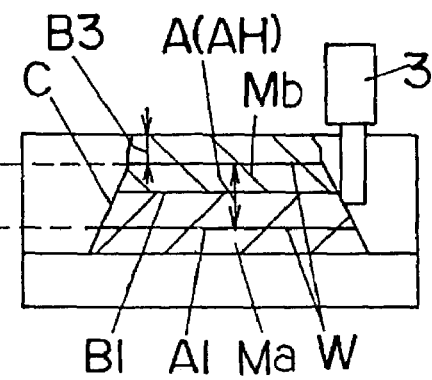

However, as a modification shown in FIGS. 5A and 5B, the trimming zone A may have a height AH that is equal to the height BH of the sintered zone B, but is defined displaced downwardly from the sintered zone B so that the growth M1 can be encompassed within the trimming zone A at a location above the lowermost limit A1 thereof. It is to be noted that while each of the underlying and overlaying laminated bodies Ma and Mb is shown having an outer peripheral surface tapering upwardly as indicated by C, it may have a cylindrical outer peripheral surface as shown in D in FIGS. 1A to 1D.

According to the modified embodiment shown in FIGS. 5A and 5B, the trimming path is so defined as to start the trimming process from a level generally intermediate of the height of the sintered zone B and then to proceeds to a level below the lowermost limit B1 of the sintered zone B. Accordingly, the excessively sintered growth M1 can be removed satisfactorily. In addition, since as clearly shown in FIG. 5B, an upper portion B3 of the sintered zone B of the overlaying laminated body Mb is left unremoved, the presence of that upper portion B3 makes it difficult for a similar excessively sintered growth to be formed during subsequent formation of a third formed laminated body (not shown) overlying the laminated body Mb and, accordingly, the size of the subsequently formed growth M1 can be reduced. As a matter of course, an outer peripheral surface area of the upper portion B3 of the second laminated body Mb may be trimmed after a third formed laminated body has been formed above the second laminated body Mb.

Figure 6:
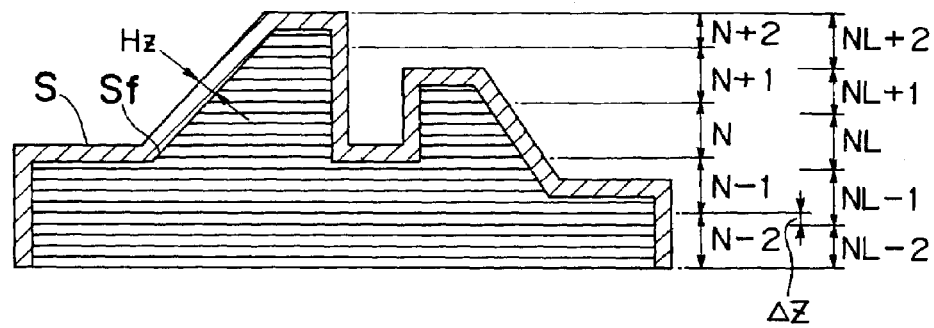
FIG. 6 is an explanatory diagram showing the modification of FIGS. 5A and 5B in a simplified fashion.

Referring now to FIG. 6, a sintered object shown therein is made up of a plurality of laminated bodies each consisting of a plurality of sintered layers and, for the trimming process, a plurality of trimming blocks are defined, with each trimming block having a heightwise range different from that of the corresponding laminated body.

Figure 7A:
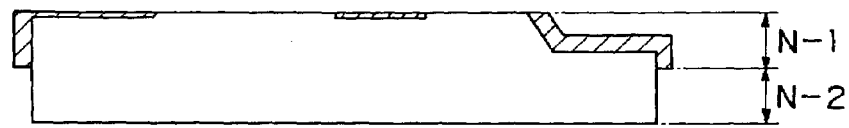
FIGS. 7A to 7D are explanatory diagrams showing the modification of FIGS. 5A and 5B, shown in sequence of process steps, respectively.
Figure 7B:
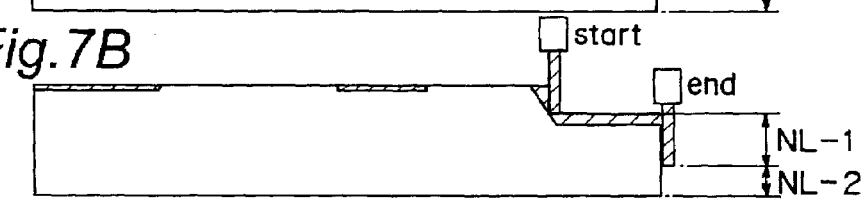
Figure 7C:
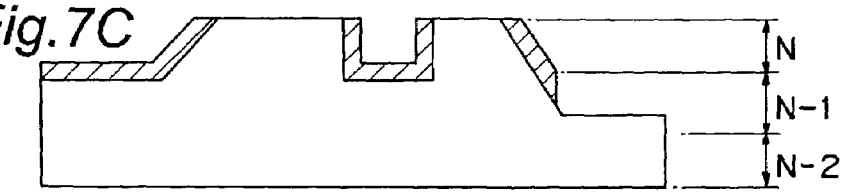
Figure 7D:
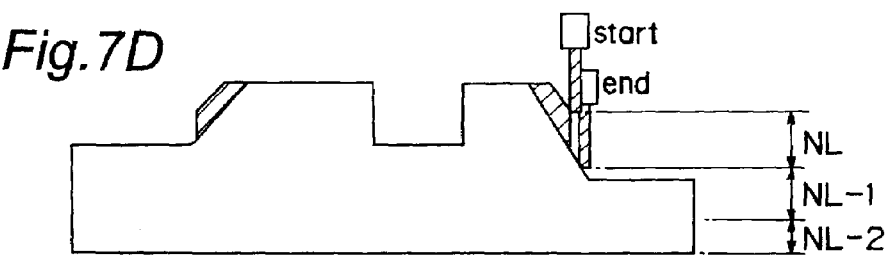

In the example shown in FIG. 6, after formation of the laminated body N–1 as shown in FIG. 7A, the trimming process is applied to a NL–1 block defined below the laminated body N–1 as shown in FIG. 7B and, after formation of the laminated body N above the laminated body N–1 as shown in FIG. 7C, the trimming process is applied to the next adjacent NL block defined below the laminated body N as shown in FIG. 7D.

The difference in level between each laminated body and the corresponding trimming block, indicated by $\Delta Z$, that is, the lowering increment over which the machining tool 3 is lowered is preferably set to a value greater than the thickness Hz of that outer surface area to be removed. By way of example, if Hz=0.2, the difference $\Delta Z$ is preferably within the range of 0.25 to 0.30 mm. This choice is effective to avoid a problem associated with the optical sintering beam being undesirably redirected to a finished surface of the object from which the unwanted surface area has been removed.

Figure 8A:
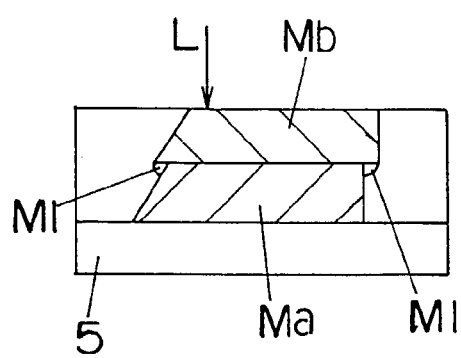
FIGS. 8A and 8B are explanatory diagrams showing another modification of the first embodiment of the present invention, respectively.
Figure 8B:
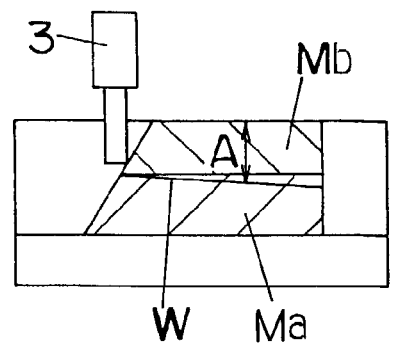

In the embodiments shown in FIGS. 1A to 1D and FIGS. 5A and 5B, respectively, in creating the machining data, a plane of separation W between the sintered zone B and the trimming zone A has been set to extend horizontally and parallel to the support base 5. However, the present invention may not be always limited thereto and the plane of separation W may be inclined as shown in FIGS. 8A and 8B.

Figure 9A:
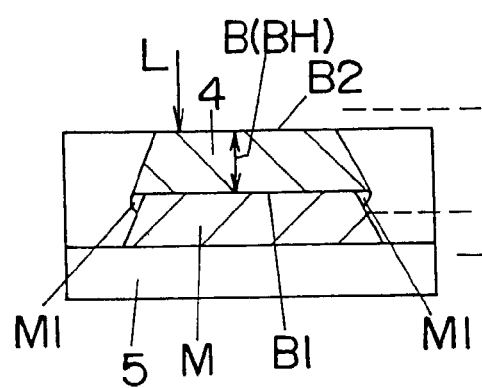
FIGS. 9A and 9B are explanatory diagrams showing a further modification of the first embodiment of the present invention, respectively.
Figure 9B:
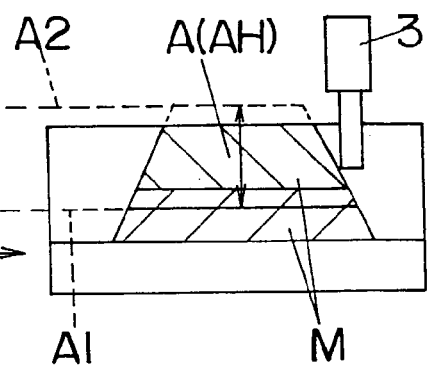

FIGS. 9A and 9B illustrate a modified form of the example shown in and described with reference to FIGS. 5A and 5B. In these figures, the uppermost limit A2 of the trimming zone A is positioned above the uppermost limit B2 of the sintered zone B and the lowermost limit A1 of the trimming zone A is positioned below the lowermost limit B1 of the sintered zone B, so as to encompass the excessively sintered growth M1, whereby the height BH of the sintered zone B is smaller than the height AH of the trimming zone A.

According to the example shown in FIGS. 9A and 9B, since the trimming zone A encompasses the excessively sintered growth M1 above the lowermost limit A1 of the trimming zone A, as is the case with that shown in and described with reference to FIGS. 5A and 5B, the excessively sintered growth M1 can be removed assuredly at the end of trimming. Also, since the uppermost limit A2 of the trimming zone A is defined at a level above the uppermost limit B2 of the sintered zone B, at the beginning of cutting performed from above, the machining tool 3 may rotate idle because of the absence of the laminated body, but as the trimming proceeds, the machining tool 3 can remove the excessively sintered growth M1. Accordingly, at the beginning of trimming an abrupt cutting resistance will not act on the machining tool 3, thereby minimizing damage to the machining tool 3.

Figure 10A:
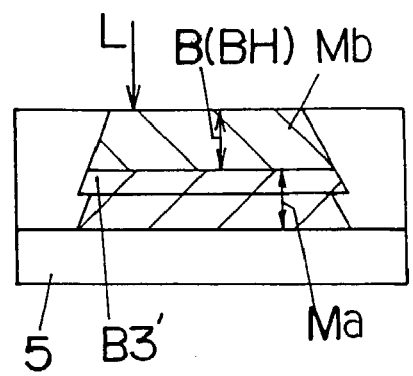
FIGS. 10A to 10C are explanatory diagrams showing a still further modification of the first embodiment of the present invention, respectively.
Figure 10B:
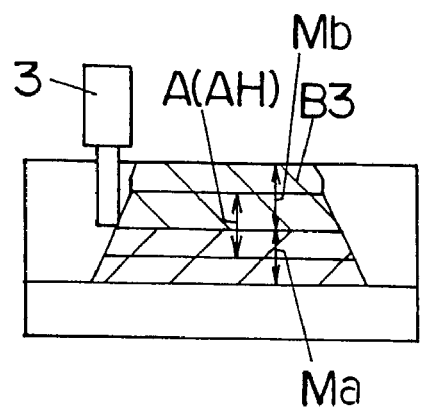
Figure 10C:
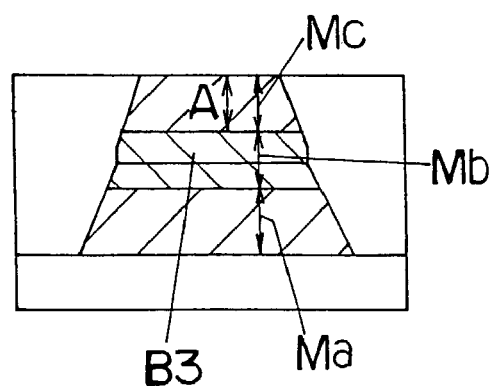

FIGS. 10A to 10C illustrate an example in which the trimming process is performed while only a predetermined thickness of an upper portion B3' of the sintered zone B defining the underlying laminated body Ma is left unremoved. Although the example shown in FIGS. 10A to 10C is basically similar to that shown in and described with reference to FIGS. 5A and 5B, this example is not limited to the height BH of the sintered zone B being equal to the height AH of the trimming zone A.

Specifically, after an outer surface area of a lower portion of the underlying laminated body Ma other than an upper portion B3' thereof has been removed and the overlaying laminated body Mb has subsequently been formed as shown in FIG. 10A, an outer surface area of a lower portion of the overlying laminated body Mb other than an upper portion B3 thereof is removed by the trimming process as shown in FIG. 10B. Then, as shown in FIG. 10C, a third laminated body Mc is formed above and on the second laminated body Mb. According to the example shown in FIGS. 10A to 10C, since at the time the second or third laminated body Mb or Mc is formed, the corresponding upper portion B3' or B3 of the second or third laminated body Mb or Mc is left unremoved, the possibility can be substantially eliminated or minimized that an excessively sintered growth would be formed sticking to the trimmed outer surface of the previously laminated body Ma or Mb. Accordingly, a load acting on the machining tool 3 during the trimming process can be lessened and a high efficiency can be appreciated.

Figure 11A:
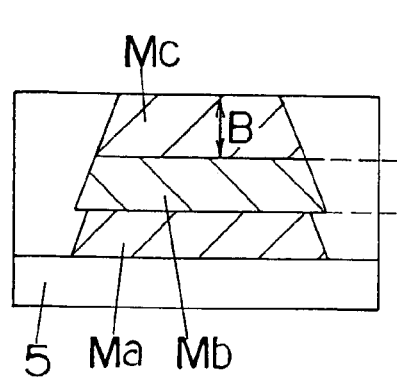
FIGS. 11A and 11B are explanatory diagrams showing a yet further modification of the first embodiment of the present invention, respectively.
Figure 11B:
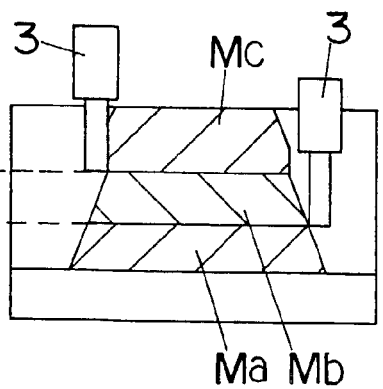

It is to be noted that in any one of the foregoing embodiments the trimming zone A has been defined so as to overlap the sintered zone B, but the present invention may not be always limited thereto and at least one sintered zone below or above the sintered zone B occupied by the laminated body M for which the trimming process has finished may be defined as the trimming zone A as shown in FIGS. 11A and 11B. In the example shown in FIGS. 11A and 11B, no trimming process is performed to the sintered zone B after sintering to form the laminated body Mb has been finished, but the trimming process is applied to the previously formed laminated body after the next succeeding laminated body has been formed above such previously formed laminated body. For example, trimming may be applied to the laminated body Mb or Ma after the laminated body Mc has been formed on the laminated body Mb.

Thus, according to the embodiment shown in FIGS. 11A and 11B, trimming is effected to the previously formed laminated body that is different from the laminated body having just been formed by sintering and, accordingly, there is no overlap between the laminated zone B and the trimming zone A. This means that there is no possibility that a part of the underlying laminated body and a part of the overlaying laminated body immediately above that part of the underlying laminated body would not be trimmed simultaneously, with efficiency consequently increased.

Figure 12:
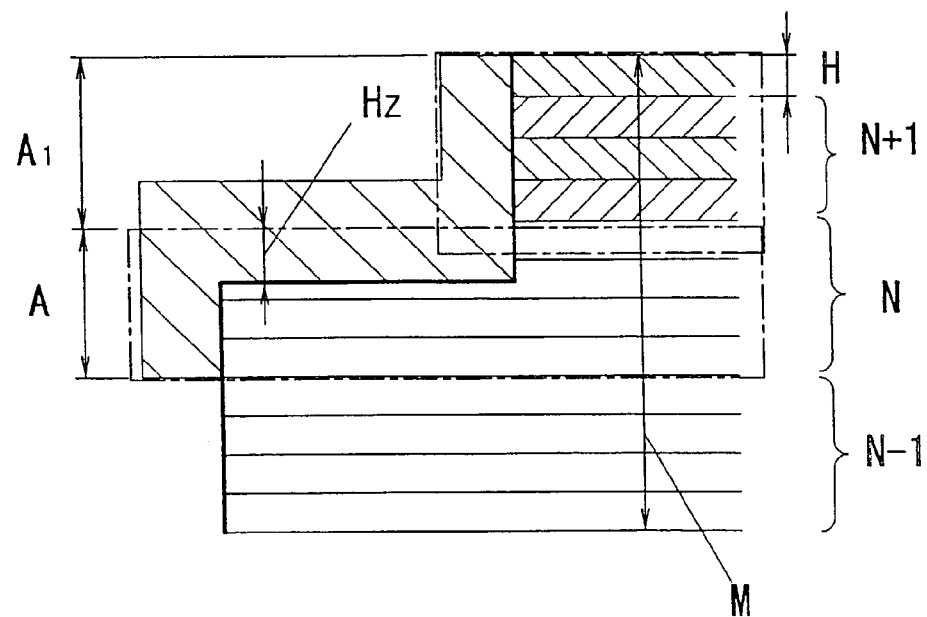
FIG. 12 is an explanatory diagram used to explain the modification shown in FIGS. 11A and 11B.

In another embodiment shown in FIG. 12, after the laminated body N+1 has been formed by cyclic repetition of sintering, the trimming zone A of the laminated body N positioned immediately below such laminated body N+1 is subjected to the trimming process. According to this embodiment, since at the time trimming had been effected to the laminated body N, the trimming zone A1 of the overlaying laminated body N+1 is left having not yet been trimmed, sintering of layers of the powdery material successively deposited above the trimming zone A1 can be performed, resulting in reduction in length of time required to calculate a machining data. In such case, however, the machining tool 3 such as a ball end mill is required to have an effective blade length greater than the sum of the respective thickness of the two adjoining laminated bodies.

Figure 13:
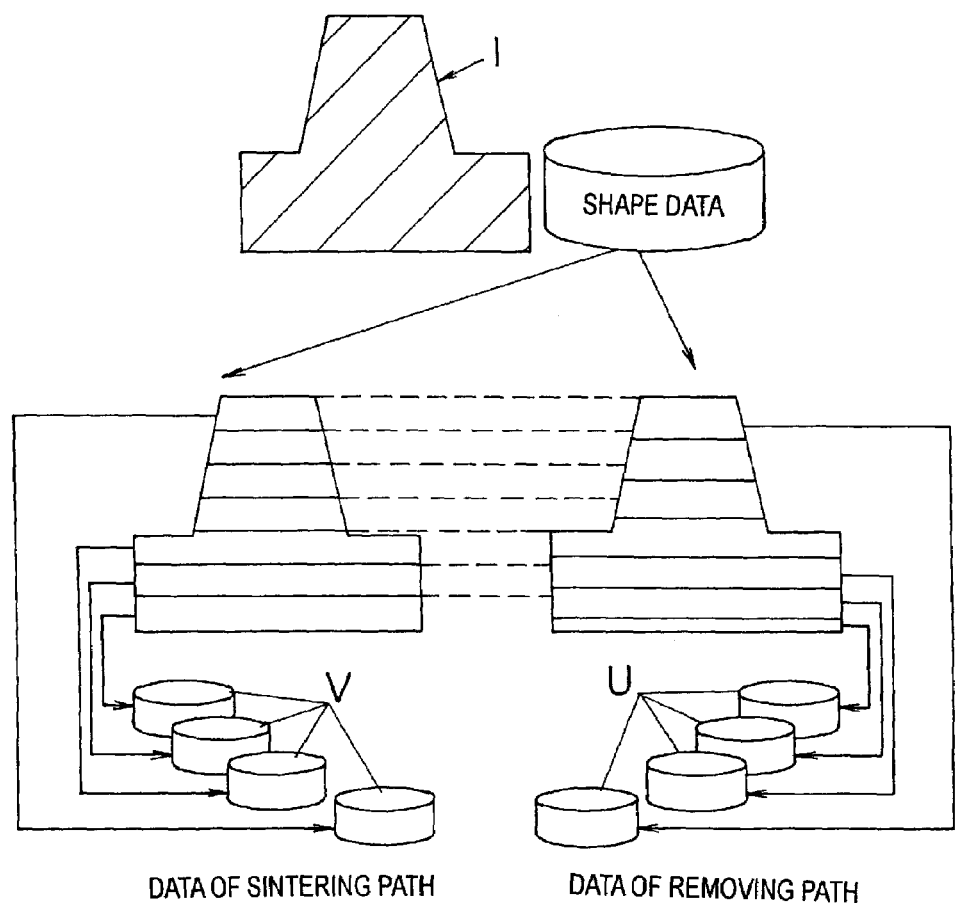
FIG. 13 is a conceptual diagram showing respective data on a trimming path and the path of travel of a sintering beam that are created from profile data of a three-dimensional model.

FIG. 13 illustrates a method in which when the data on the path of travel of the sintering laser (hereinafter referred to as "beam travel path data") and trimming path data are to be created from 3D profile data of the object desired to be formed, the trimming path data U is at a position (height and width) different from the beam travel path data V so that the excessively sintered growth M1 can be encompassed.

Figure 14:
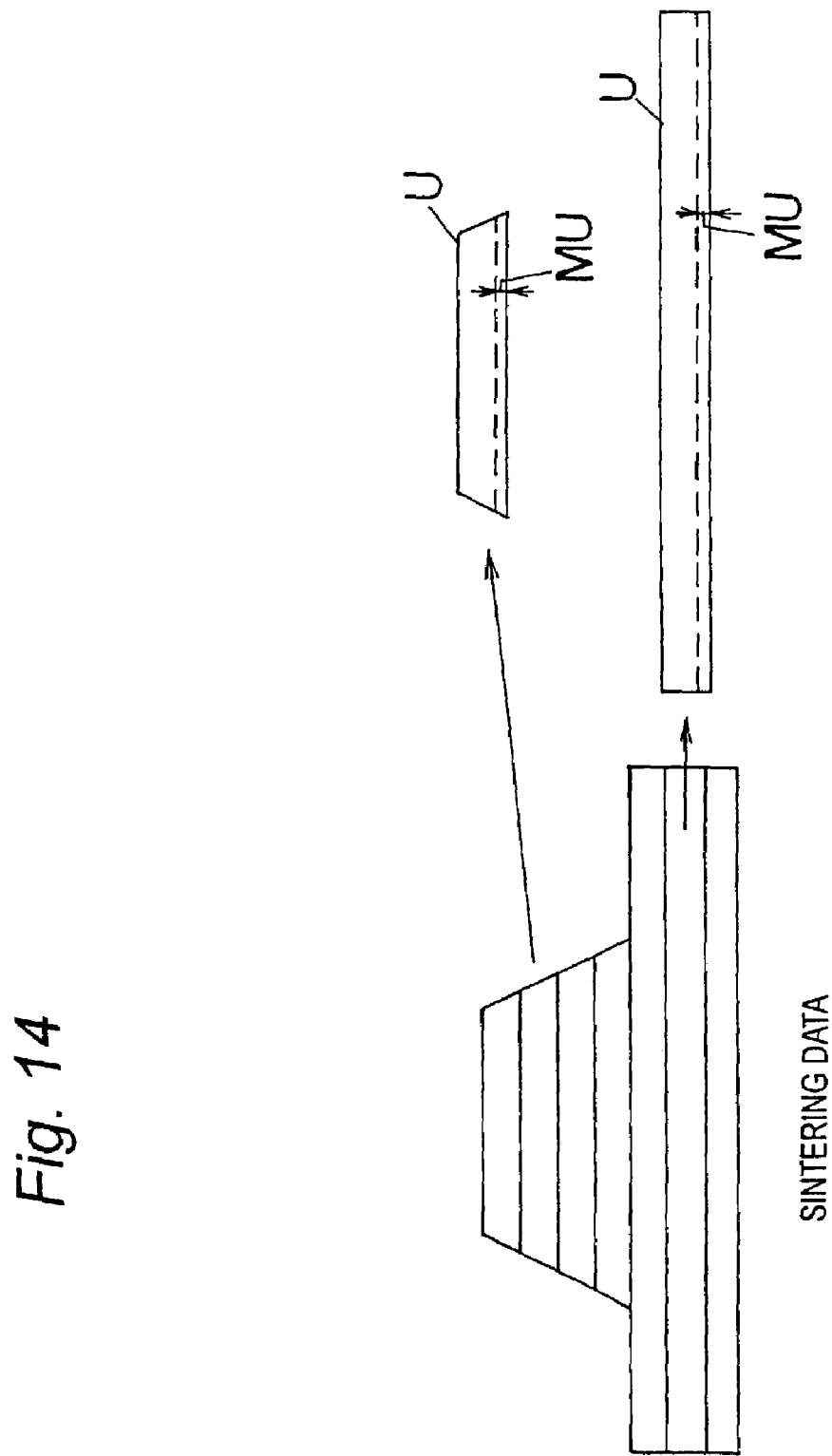
FIG. 14 is a conceptual diagram showing a relation between the respective data on the trimming path and the path of travel of the sintering beam.

More concretely, as shown in FIG. 14, the trimming path data U is so split that it increases downwardly by addition of at least a region Mu encompassing the excessively sintered growth (See FIGS. 1A to 1D, FIGS. 5A and 5B, FIGS. 8A and 8B, or FIGS. 9A and 9B) than the beam travel path data V. Thus, since a lower region of the trimming path data U includes the region Mu encompassing the excessively sintered growth, the latter can be assuredly removed by trimming. It is to be noted that the width of separation of the path data may not be equal such as shown in FIGS. 13 and 14, and separation may be made to a different width depending on the 3D model profile and the machining tool used.

Second Embodiment (FIGS. 15 to 19B)

Figure 15:
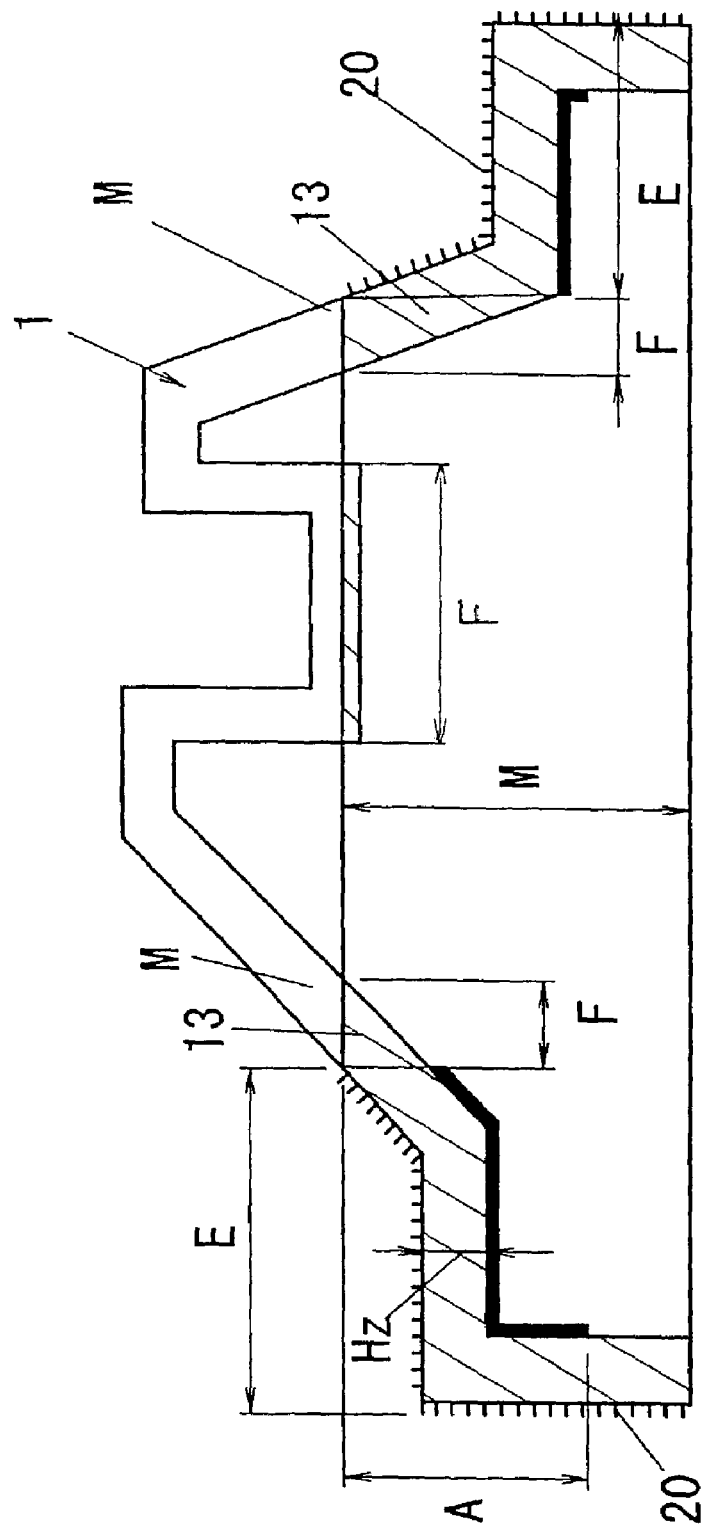
FIG. 15 is an explanatory diagram showing the object making method according to a second preferred embodiment of the present invention.

This embodiment is featured in that as shown in FIG. 15, a lower surface portion 13 of the outer surface area of the shape of the expected laminated body M, which would be subsequently formed by cyclic repetition of sintering, at a location above the predetermined trimming zone A is defined as an untrimmed area F while the trimming is applied only to a region E exclusive of the untrimmed area F. In other words, the lower surface portion 13 of the outer surface area of the shape of the expected laminated body M, which would be subsequently formed is represented by a portion of the projection formed immediately below the surface area of the shape of the expected laminated body M when the optical sintering beam is directed thereto. Without the lower surface portion 13 being trimmed, and by effecting the trimming only to the region E excluding the lower surface portion 13, successive sintered layers of the laminated body M can be formed above the untrimmed area F.

Specifically, when the predetermined trimming zone A is to be trimmed, the lower surface portion 13 of the outer surface area of the shape of the laminated body M, which would be subsequently formed above the trimming zone A is left untrimmed, so that when the laminated body M is to be formed by cyclic repetition of sintering, successive sintered layers of the laminated body M above the trimming zone A can be deposited in overlapping relation with the lower surface portion 13 that is defined as the untrimmed portion F. Accordingly, sintering of the powdery material will not be effected at a location where the trimming has been completed will not take place such as occurring in the prior art and, therefore, there is no area that is left untrimmed.

As one method to determine the trimming zone A discussed above, as shown in FIG. 16, a portion of the laminated body M immediately above the trimming zone A, which is not included within a target surface area L1 that is to be irradiated with the optical sintering beam may be defined as the region E to be trimmed. In such case, it is possible to define the region E to be trimmed based on the target surface area L1 that is to be irradiated with the optical sintering beam. Also, when trimming pulses are to be generated, they may be so generated that the machining tool 3 will not enter the region F to be left untrimmed.

Figure 16:
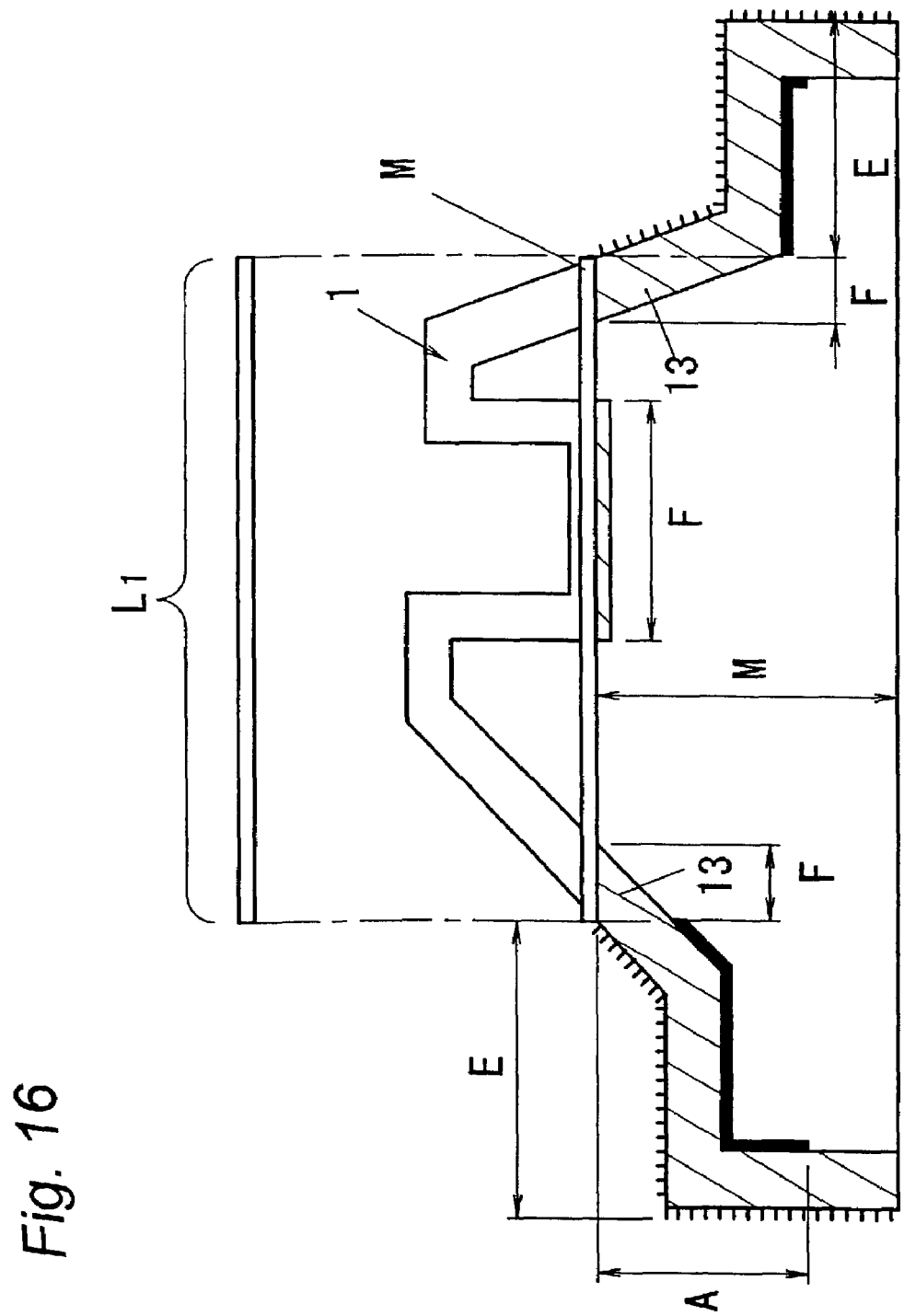
FIG. 16 is an explanatory diagram showing a modification of the second embodiment of the present invention.
Figure 17A:
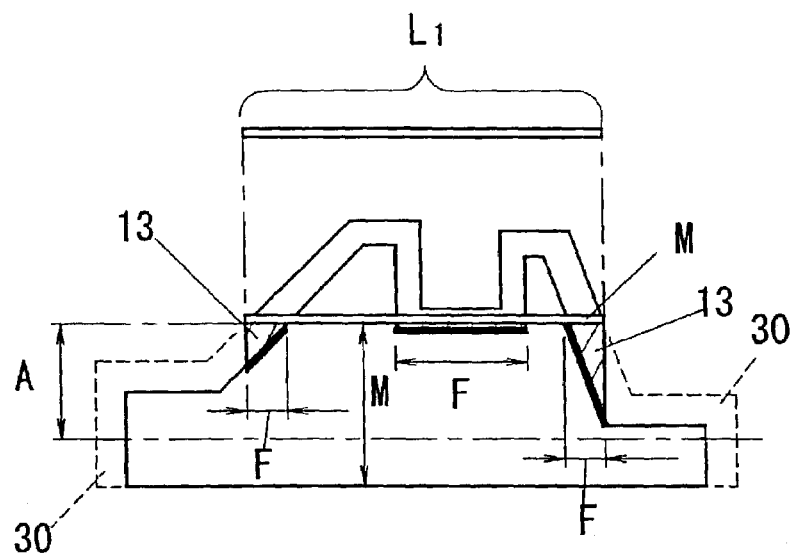
FIGS. 17A and 17B are explanatory diagrams showing another modification of the second embodiment of the present invention, respectively.
Figure 17B:
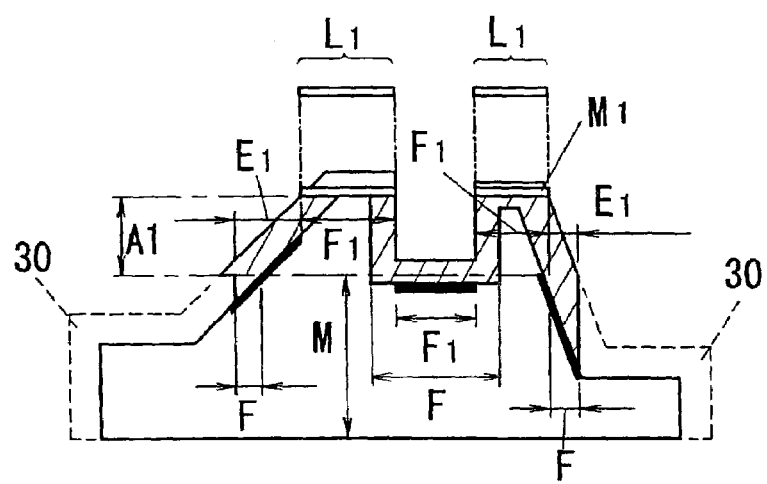

A modification of the embodiment shown in FIGS. 15 and 16 is shown in FIGS. 17A and 17B, in which that portion defined as the region F to be left untrimmed during the previous trimming applied to the trimming zone A is determined if it can be trimmed during the subsequent trimming applied to the trimming zone A of the subsequently formed laminated body and, only when it is determined as trimmable, the region F left untrimmed during the previous trimming is added to the region E to be trimmed subsequently. It is to be noted that the area 30 indicated by the dotted line in FIG. 17B represents the area which has already been trimmed.

In this embodiment, as shown in FIG. 17A, decision is made to determine if that portion defined as the region F to be left unremoved during the trimming of the trimming zone A to which the trimming has already been effected can be trimmed during the subsequently performed trimming applied to the trimming zone A1 of the subsequently formed laminated body. At this time, a portion of the laminated body M1 immediately above the trimming zone A1 that is to be subsequently trimmed, which is not encompassed within the target surface area L1 that is to be irradiated with the optical sintering beam is determined as the region E1 to be trimmed during the subsequent trimming applied to the trimming zone A1, while a portion other than the region E1 is determined as the region F1 to be left untrimmed. In the event that it is determined that the region F left untrimmed during the previous trimming can be trimmed during the subsequent trimming to be effected to remove the region E1, the region F left untrimmed during the previous trimming is removed together with the region E1 being trimmed.

Thus, it will readily be seen that as shown in FIG. 17A, it is possible to successively form the laminated bodies M and M1 over the region F left untrimmed during the previous trimming. Also, by removing the region F left untrimmed during the previous trimming, which has been determined unnecessary during the subsequent trimming applied to the region E1 to be subsequently trimmed, it is possible to avoid the possibility that the region F determined unnecessary during the previous trimming may be left untrimmed.

Figure 18A:
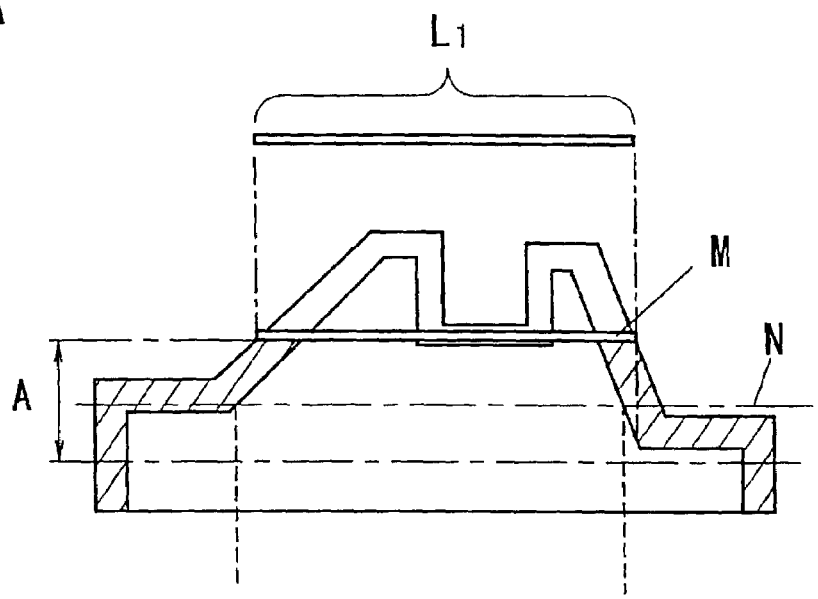
FIGS. 18A and 18B are explanatory diagrams showing a further modification of the second embodiment of the present invention, respectively.
Figure 18B:
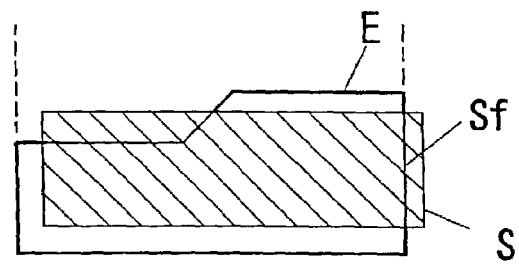
Figure 19A:
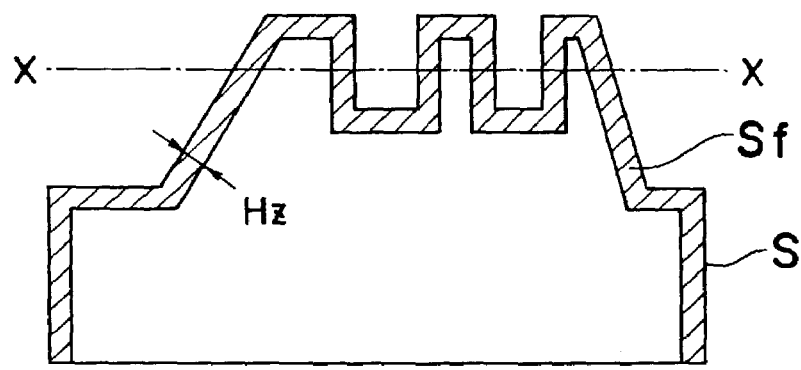
FIGS. 19A and 19B are conceptual diagrams showing a zone to be removed and a zone to be left untrimmed in the practice of the modified object making method shown above, respectively.
Figure 19B:
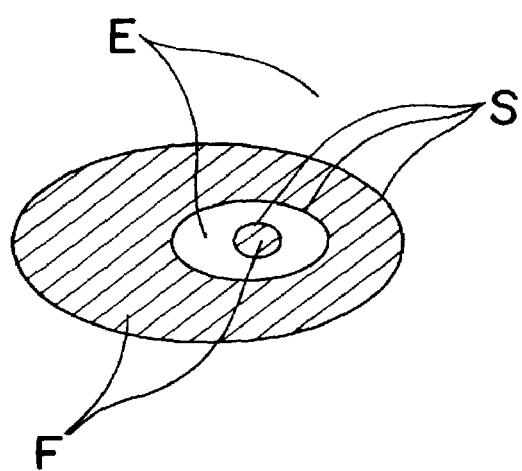
Figure 20A:
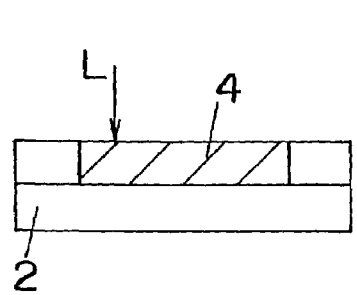
FIGS. 20A to 20D are explanatory diagrams showing the prior art object making method, respectively.
Figure 20B:
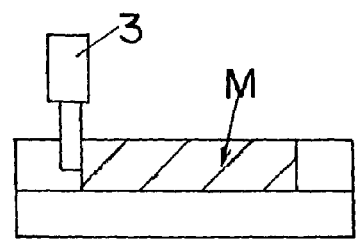
Figure 20C:
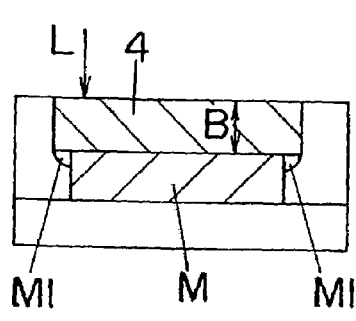
Figure 20D:
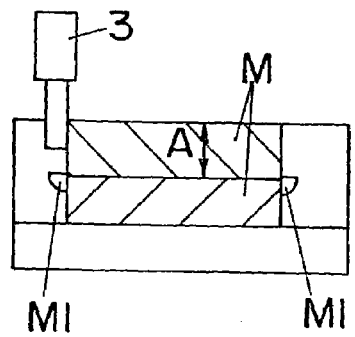
Figure 21A:
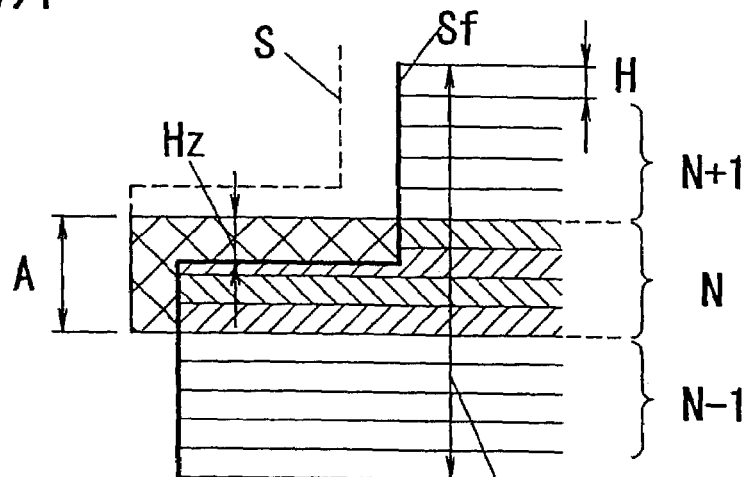
FIGS. 21A to 21C are different explanatory diagrams showing the prior art object making method, respectively.
Figure 21B:
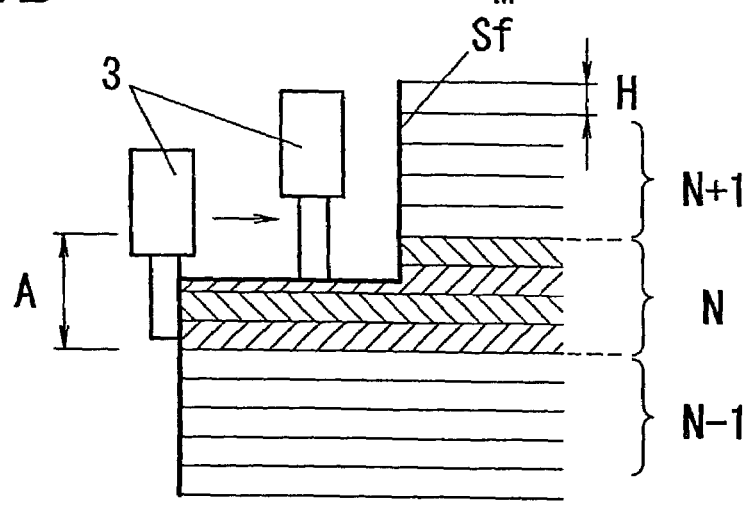
Figure 21C:
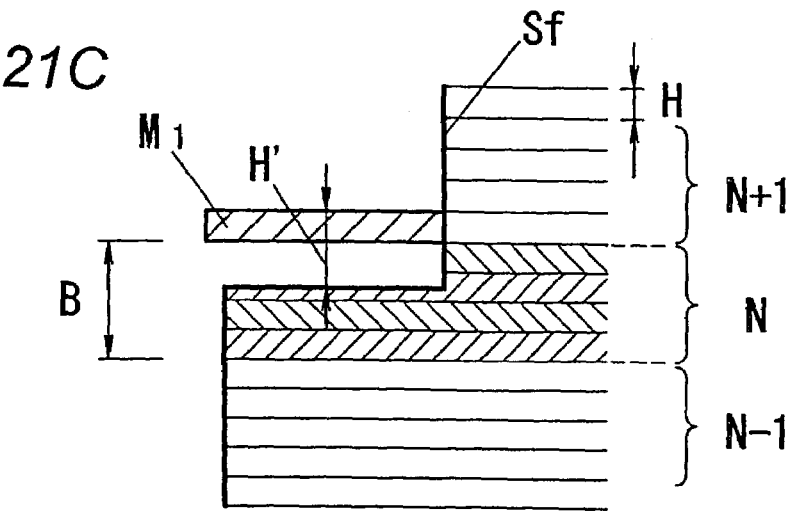
Figure 22:
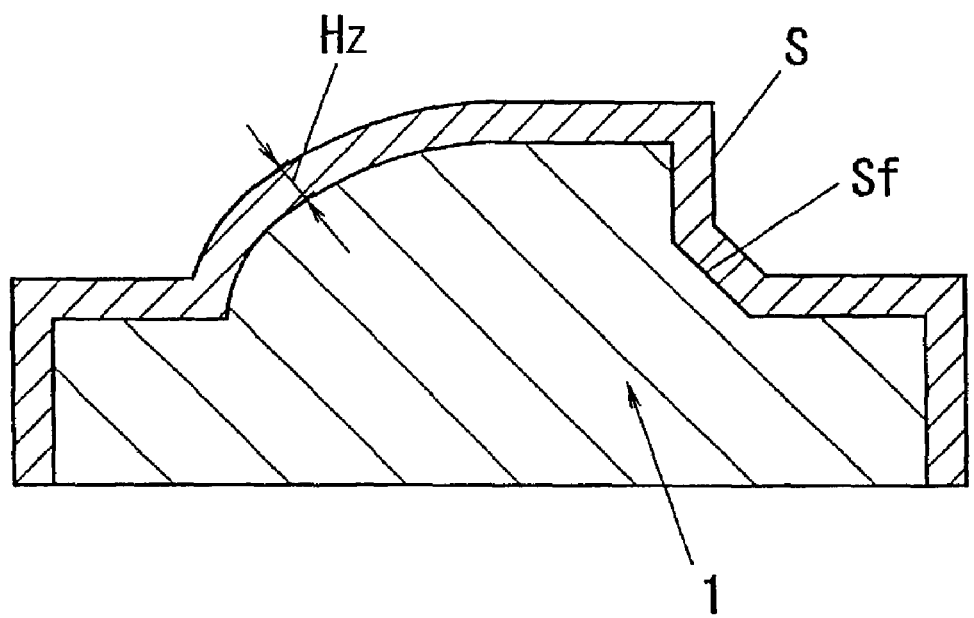
FIG. 22 is an explanatory diagram conceptually showing a relationship in dimension between a contour of a laminated body and a contour of a cross-sectional shape of one of the laminated bodies that is finally finished.

Another modification of the embodiment shown in FIGS. 15 and 16 is shown in FIGS. 18A and 18B, in which comparison is made between the contour S of the laminated body M immediately above a predetermined trimming zone A and cross-sectional contour Sf of an expected laminated body to be subsequently formed or finished, which is at the same height as the contour S of the laminated body M, so that an area outside a region encompassed within the contour S of the laminated body M can be determined as the region E to be trimmed. In FIG. 18A, reference character N represents a position at which the trimming is to be effected (for example, a contour path). In this modification, the contour S of the laminated body M immediately thereabove is determined in reference to the pattern L1 of irradiation with the optical sintering beam, followed by comparison of the contour S with the cross-sectional contour Sf of that expected laminated body to be subsequently formed or finished, which is at the same height as the contour S of the laminated body M, so that the area E (FIG. 18B) outside the region encompassed within the contour S of the laminated body M can be determined as the region E to be trimmed. In this way, it is possible to determine the region E to be trimmed of the predetermined trimming zone A. Also, at the time of generation of the trimming path, it is possible to prevent the machining tool 3 from entering the region F to be left untrimmed.

Where as shown in FIG. 19A the object desired to be formed has some surface irregularities and/or a generally round end face inside the cross-sectional contour of the object taken in an X-Y plane, an area hatched in FIG. 19B is to be defined as the region F to be left untrimmed while the remaining portion is defined as the region E to be trimmed.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method for making a three-dimensional object, comprising:
   forming a plurality of sintered layers of powdery material, including forming each sintered layer by dispersing powdery material on a target surface, and scanning at least a portion of the dispersed powdery material with an optical sintering beam;
   forming a plurality of integral laminated bodies, each including a respective set of the sintered layers of powdery material interlocked with each other in a layered fashion; and
   trimming a first zone to remove unwanted portions of a respective integral laminated body among the integral laminated bodies each time an integral laminated body among the integral laminated bodies is formed,
   wherein the first zone is different from a second zone in which the integral laminated body is formed,
   wherein during the trimming, the first zone is defined to encompass an excessively sintered growth developed as a result of formation of the integral laminated body, and
   wherein the trimming removes the unwanted surface portion while leaving an upper portion of the integral laminated body untrimmed.

2. A method for making a three-dimensional object, comprising:
   forming a plurality of sintered layers of powdery material, including forming each sintered layer by dispersing powdery material on a target surface, and scanning at least a portion of the dispersed powdery material with an optical sintering beam;

forming a plurality of integral laminated bodies, each including a respective set of the sintered layers of powdery material interlocked with each other in a layered fashion; and trimming a first zone to remove unwanted portions of a respective integral laminated body among the integral laminated bodies each time an integral laminated body among the integral laminated bodies is formed, wherein the first zone is different from a second zone in which the integral laminated body is formed, wherein during the trimming, the first zone is defined to encompass an excessively sintered growth developed as a result of formation of the integral laminated body, and wherein the trimming is initiated from below a corresponding margin of the integral laminated body that is to be trimmed.

3. A method for making a three-dimensional object, comprising:

forming a plurality of sintered layers of powdery material, including forming each sintered layer by dispersing powdery material on a target surface, and scanning at least a portion of the dispersed powdery material with an optical sintering beam;

forming a plurality of integral laminated bodies, each including a respective set of the sintered layers of powdery material interlocked with each other in a layered fashion; and trimming a first zone to remove unwanted portions of a respective integral laminated body among the integral laminated bodies each time an integral laminated body among the integral laminated bodies is formed, wherein the first zone is different from a second zone in which the integral laminated body is formed, wherein during the trimming, the first zone is defined to encompass an excessively sintered growth developed as a result of formation of the integral laminated body, and wherein a beam travel path of the optical sintering beam and a trimming path of the trimming are created from a three-dimensional profile data of the three-dimensional object to be formed, and data on the trimming path of the trimming are set at a first position different from a second position for the beam travel path of the optical sintering beam.

4. The method as claimed in claim 3, wherein the data on the trimming path of the trimming are set so as to expand further downwardly than the data on the beam travel path, to encompass an excessively sintered growth.

5. A method of making a three-dimensional object, which comprises:

forming a plurality of sintered layers of powdery material, including forming each sintered layer by dispersing powdery material on a target surface, and scanning at least a portion of the dispersed powdery material with an optical sintering beam;

forming a plurality of integral laminated bodies, each including a respective set of the sintered layers of powdery material interlocked with each other in a layered fashion; and trimming an unwanted surface portion from around a respective integral laminated body, including dividing an unwanted surface portion to be removed into a plurality of zones to be removed, wherein a zone of a surface area of a shape of an expected integral laminated body to be subsequently formed above a zone among the zones to be removed is defined as a zone to be left untrimmed, and wherein said trimming is applied only to the zones to be removed, excluding the zone to be left untrimmed.

6. The method as claimed in claim 5, wherein in the zones to be removed, a portion of an integral laminated body immediately thereabove and that is not encompassed within a pattern of irradiation by the optical sintering beam is determined as a range that can be removed.

7. The method as claimed in claim 5, wherein in the zones to be removed, a determination is made whether it is possible to trim a portion of a zone to be first removed and which is determined as an area to be left untrimmed during trimming of a zone to be removed that is subsequently removed and, only if the determination is made that the portion can be removed, a zone left untrimmed is added to the zone to be removed during a subsequent trimming.

8. The method as claimed in claim 5, wherein a comparison is made between a contour of an integral laminated body immediately above a trimming zone and a cross-sectional contour of the expected integral laminated body to be subsequently formed, wherein the cross-sectional contour of the expected integral laminated body has a same height as the contour of the integral laminated body immediately above the trimming zone, and wherein an area outside the contour of the integral laminated body immediately above the trimming zone is determined as a region to be trimmed.

9. The method as claimed in claim 5, wherein the zones to be removed are collectively larger than an integral laminated body, so that an uppermost limit of the zones to be removed lies above an uppermost limit of the integral laminated body and a lowermost limit of the zones to be removed lies below a lowermost limit of the integral laminated body.

* * * * *